(12) United States Patent
Ishibashi et al.

(10) Patent No.: US 8,031,984 B2
(45) Date of Patent: Oct. 4, 2011

(54) SEMICONDUCTOR OPTICAL MODULATOR

(75) Inventors: Tadao Ishibashi, Tokyo (JP); Nobuhiro Kikuchi, Atsugi (JP); Ken Tsuzuki, Atsugi (JP)

(73) Assignees: NTT Electronics Corporation, Kanagawa (JP); Nippon Telegraph and Telephone Corporation, Tokyo (JP)

( * ) Notice: Subject to any disclaimer, the term of this patent is extended or adjusted under 35 U.S.C. 154(b) by 367 days.

(21) Appl. No.: 12/445,616

(22) PCT Filed: Oct. 24, 2007

(86) PCT No.: PCT/JP2007/070752
§ 371 (c)(1),
(2), (4) Date: Apr. 15, 2009

(87) PCT Pub. No.: WO2008/050809
PCT Pub. Date: May 2, 2008

(65) Prior Publication Data
US 2010/0296766 A1 Nov. 25, 2010

(30) Foreign Application Priority Data
Oct. 24, 2006 (JP) .................................. 2006-288839

(51) Int. Cl.
*G02F 1/025* (2006.01)

(52) U.S. Cl. .................. 385/2; 385/1; 385/14; 385/131; 385/141

(58) Field of Classification Search .................. 385/1, 2, 385/3, 14, 39, 40, 129, 130, 131, 141
See application file for complete search history.

(56) References Cited

U.S. PATENT DOCUMENTS

| 7,355,778 B2 * | 4/2008 | Tsuzuki et al. ............... 359/248 |
| 2006/0159381 A1 | 7/2006 | Tsuzuki et al. |
| 2007/0172184 A1 | 7/2007 | Ishicashi et al. |
| 2008/0304786 A1 | 12/2008 | Ishibashi et al. |
| 2009/0034904 A1 | 2/2009 | Tsuzuki et al. |

(Continued)

FOREIGN PATENT DOCUMENTS
EP 0468709 1/1992
(Continued)

OTHER PUBLICATIONS

European Search Report from corresponding Euroepan Patent Application No. 07830486.2 dated Oct. 29, 2009.

(Continued)

*Primary Examiner* — Brian Healy
(74) *Attorney, Agent, or Firm* — Workman Nydegger

(57) ABSTRACT

The present invention can provide an npin-type optical modulator that has a high withstand voltage and is easily fabricated. A semiconductor optical amplifier (10) according to an embodiment of the present invention is an npin-type semiconductor optical modulator in which layers are sequentially stacked, with a cathode layer (12-1) arranged on the substrate side, including at least a first n-type cladding layer (13-1), a p-type cladding layer (14), a core layer (17) and a second n-type cladding layer (13-2). In this semiconductor optical modulator, the p-type cladding layer (14) is electrically connected to an electrode (18-1) of the cathode layer. Accordingly, the accumulation of holes in the p-type cladding layer associated with light absorption in the npin-type optical modulator can be absorbed in the electrode on the negative side. This npin-type semiconductor optical modulator can be comparatively easily fabricated using conventional semiconductor manufacturing techniques by adopting a mesa type waveguide structure.

11 Claims, 8 Drawing Sheets

U.S. PATENT DOCUMENTS

2010/0296766 A1* 11/2010 Ishibashi et al. .................. 385/2
2010/0296769 A1* 11/2010 Ishibashi et al. .................. 385/2

FOREIGN PATENT DOCUMENTS

| EP | 1598692 | 11/2005 |
|---|---|---|
| EP | 1672410 | 6/2006 |
| EP | 1857857 | 11/2007 |
| JP | 3-156988 A1 | 7/1991 |
| JP | 2005-099387 A1 | 4/2005 |
| JP | 2005-116644 A1 | 4/2005 |
| JP | 4036878 B1 | 11/2007 |
| JP | 2005-114868 A1 | 4/2008 |
| WO | WO 2005/033784 | 4/2005 |
| WO | WO 2006/095776 A1 | 9/2006 |

OTHER PUBLICATIONS

Korean Office Action issued Sep. 16, 2010 in the related Korean Patent Application No. 2005-114868.

PCT Notification of Transmittal of Translation of the International Preliminary Report on Patentability (Chapter 1 or Chapter II of the Patent Cooperation Treaty) of related Japanese Application No. PCT/JP2007/070752, dated May 7, 2009 (6 pages).

* cited by examiner

SEMICONDUCTOR OPTICAL MODULATOR

TECHNICAL FIELD

The present invention relates to a semiconductor optical modulator and, more particularly, to an ultra-high speed semiconductor optical modulator operating in a long wavelength region.

BACKGROUND ART

Optical signals used in a long-distance wavelength multiplexed optical communication system are required to have small wavelength chirp in order to suppress the influence of the fiber dispersion effect. Such optical signals are usually generated by a configuration combined with a laser diode light source and an external modulator. A typical external modulator of this kind is an LN modulator fabricated with LiNbO3 (LN) waveguides. The operation principle of the LN modulator is to couple an optical waveguide with an electrical waveguide, inducing a change in refractive index based on the electro-optic effect by an electrical signal input and creating a phase change in the optical signal. Such LN modulator includes not only a simple optical phase modulator, but also an optical intensity modulator composed of a Mach-Zehnder interferometer, and a device operating as a highly-functional optical switch with numbers of waveguides combined, etc.

Also, there exists a semiconductor optical modulator using the same principle of operation as the LN modulator. There are, for example, a GaAs optical modulator in which a Schottky electrode is disposed on semi-insulating GaAs and formed as an opto-electronic waveguide, an InP/InGaAsP optical modulator configured to apply a voltage more effectively to the core portion of the waveguide along with the optical confinement by using a hetero pn-junction, and the like. While semiconductor optical modulators have an advantage of a small size, there is a problem that the driving voltage is high in both the GaAs optical modulators and the pn-junction type InP/InGaAsP optical modulators.

Recently, what has been proposed as a structure for avoiding such problems is an npin-type optical modulator structure in which both InP cladding layers are made n-type and a thin p layer (p-type barrier layer) is inserted between the two n layers as a barrier layer for suppressing an electron current (Patent Document 1). This npin-type allows the use of a relatively long waveguide because no p-type cladding layer having large optical loss is used. Furthermore, because it has the degree of freedom in that the thickness of a depletion layer can be optimally designed at any value, a reduction of a driving voltage and matching between the electric speed and the light speed can easily be satisfied simultaneously, which is an advantage to improving the response speed of a modulator.

However, the npin-type optical modulator has a semiconductor layer structure similar to that of a transistor, and therefore, when finite light absorption occurs, there is a problem that generated hole carriers accumulate in the p-type barrier layer. Due to this phenomenon, the height of barriers decreases which causes what is called the phototransistor behavior. This can cause not only an increase in the electron current across terminals, i.e., a decrease in withstand voltage, but also dispersion in frequency. Thus, what has been proposed is a structure for sweeping out the accumulated holes by locally forming a new p-type layer (Patent Document 2). However, it has a disadvantage in that it is structurally complex.

FIG. 8 shows the structure of a semiconductor optical modulator according to such conventional technology. This semiconductor optical modulator 80 has first n-type electrode layer 82-1 formed on semiconductor substrate 81, on which first n-type electrode 88-1 and first n-type cladding layer 83-1 are formed. On top of first n-type cladding layer 83-1, layers are further stacked in order of first low-concentration cladding layer 85-1, first intermediate layer 86-1, core layer 87, second intermediate layer 86-2, second low-concentration cladding layer 85-2, p-type cladding layer 84, second n-type cladding layer 83-2, second n-type electrode layer 82-2, and second n-type electrode 88-2. For portions of second n-type cladding layer 83-2 and second n-type electrode layer 82-2, regions 89 are formed in which the conductive type is changed from n-type to p-type.

The core layer 87 is configured such that the electro-optic effect works effectively at an operating optical wavelength. Second intermediate layer 86-2 serves as a connecting layer for preventing carriers occurred due to light absorption from being trapped at a hetero interface, and p-type cladding layer 84 serves as an electronic barrier. In the structure of the semiconductor optical modulator shown in FIG. 8, second n-type electrode 88-2 is in contact with second n-type electrode layer 82-2 and p-type regions 89, and has the same electric potential. Therefore, it allows the holes accumulated in p-type cladding layer 84 due to light absorption to flow to second n-type electrode 88-2, thereby enabling the optical modulator to operate at a higher reverse voltage and in a more stable manner.

However, in order to introduce regions 89 in which the conduction type is changed from n-type to p-type, it is required to use techniques, such as the thermal diffusion of Zn and the implantation of Be ions. This makes the manufacturing process complex, which causes an increased cost of the device for manufacturing.

The present invention has been made in view of such problems, and the object of the invention is to provide an npin-type optical modulator that has a high reverse voltage and is simple to fabricate.

Japanese Patent Laid-Open No. 2005-099387
Japanese Patent Laid-Open No. 2005-114868 (FIGS. 1 to 3)

DISCLOSURE OF THE INVENTION

In order to achieve such object, a semiconductor optical modulator according to an embodiment of the present invention is an npin-type semiconductor optical modulator having layers stacked with a cathode layer arranged on the substrate side, including at least a first n-type cladding layer, a p-type cladding layer, a core layer and a second n-type cladding layer, which is characterized in that the p-type cladding layer is electrically connected to an electrode of the cathode layer.

The semiconductor optical modulator according to an embodiment of the present invention is characterized in that the p-type cladding layer forms a mesa and a side surface of the mesa is electrically connected to the electrode of the cathode layer.

The semiconductor optical modulator according to an embodiment of the present invention is characterized in that a p-type ohmic region is formed in a portion of the p-type cladding layer and the p-type ohmic region is electrically connected to the electrode of the cathode layer.

The semiconductor optical modulator according to an embodiment of the present invention is characterized in that it includes a first intermediate layer below the core layer and a second intermediate layer above the core layer, wherein the band gap energy of the first intermediate layer is larger than that of the core layer and is smaller than that of a layer below the first intermediate layer, and wherein the band gap energy of the second intermediate layer is larger than that of the core layer and is smaller than that of a layer above the second intermediate layer.

The semiconductor optical modulator according to an embodiment of the present invention is characterized in that the p-type cladding layer has a smaller electron affinity than that of the first n-type cladding layer.

BEST MODE FOR CARRYING OUT THE INVENTION

Some embodiments of the present invention will be described in detail below with reference to the drawings.

Embodiment 1

Figure 1:
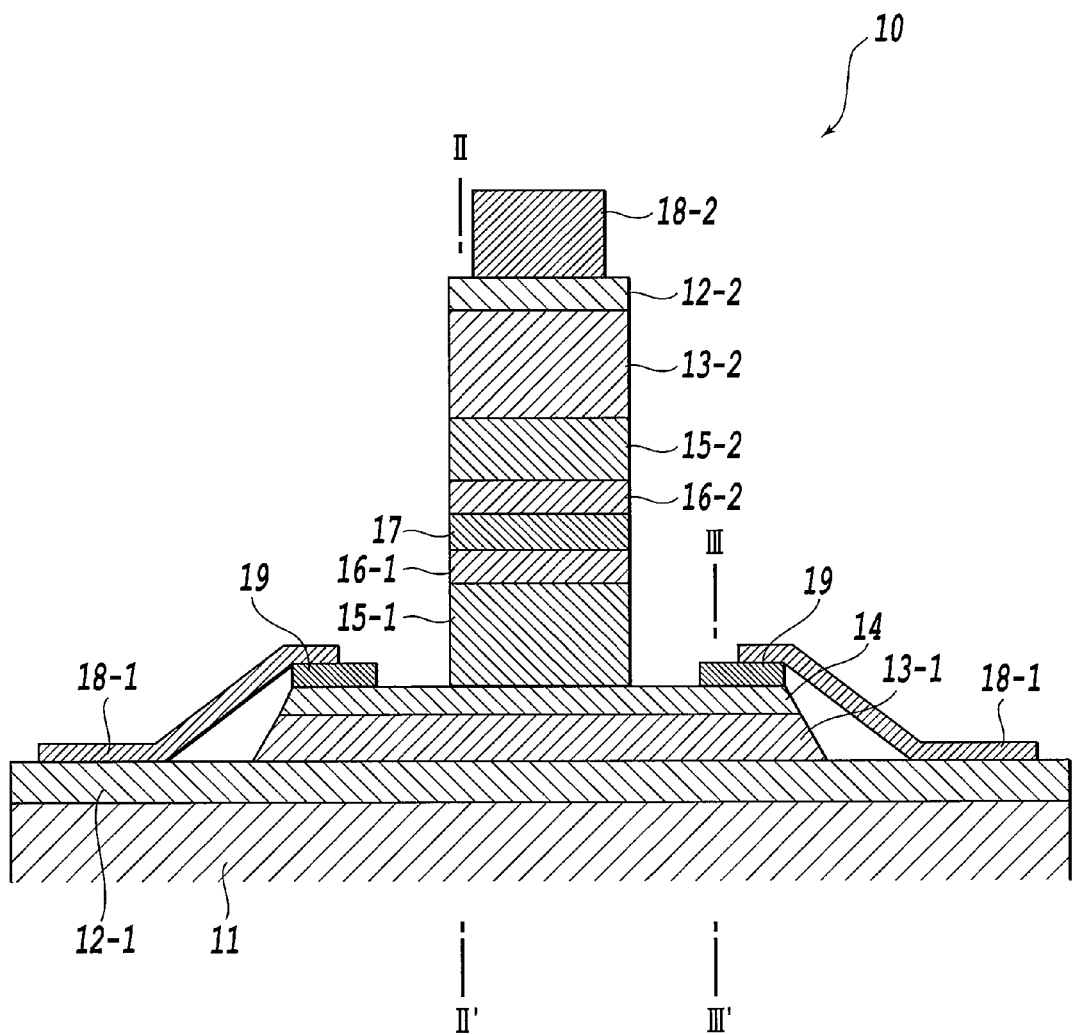
FIG. 1 is a sectional view of a semiconductor optical modulator in accordance with the first embodiment of the present invention.

FIG. 1 shows a sectional view of a semiconductor optical modulator in accordance with the first embodiment of the present invention. In this optical modulator 10, first n-type electrode layer (n+-InP) 12-1 is formed on semi-insulating InP substrate 11, and on top of that, first n-type cladding layer (n-Inp) 13-1 is formed. On first n-type cladding layer 13-1, p-type cladding layer (p-InP) 14 is formed, which serves as an electronic barrier, and on top of that, p-type electrode 19 and first low-concentration cladding layer (ud-InP) 15-1 are formed. On top of the p-type electrode 19, first n-type electrode 18-1 in contact with first n-type electrode layer 12-1 is formed. On the other hand, on top of first low-concentration cladding layer 15-1, layers are further stacked in order of first intermediate layer (ud-InGaAsP) 16-1, core layer 17, second intermediate layer (ud-InGaAsP) 16-2, second low-concentration cladding layer (usually, n--InP) 15-2, second n-type cladding layer (n-InP) 13-2, second n-type electrode layer (n+-InP) 12-2, and second n-type electrode 18-2.

Core layer 17 is structured such that the electro-optic effect works effectively at an operating optical wavelength. For example, in the case of a 1.5 μm band device, a multi-quantum-well structure may be employed making InGaAs layers with the Ga/Al composition varied as quantum well layers and quantum barrier layers. The first intermediate layer 16-1 serves as a connecting layer for preventing carriers generated due to light absorption from being trapped at a hetero interface.

In the fabrication of this semiconductor optical modulator 10, on top of substrate 11, respective layers from first n-type electrode layer 12-1 to second n-type electrode layer 12-2 are epitaxially grown and then the layers from first low-concentration cladding layer 15-1 to second n-type electrode layer 12-2 are etched to form a mesa type waveguide structure. Subsequently, first n-type cladding layer 13-1 and p-type cladding layer 14 are etched to expose first n-type electrode layer 12-1. Then, p-type electrode 19, first n-type electrode 18-1 and second n-type electrode 18-2 are formed, respectively. As required, the mesa surface may be protected by depositing a passivative coating.

Figure 2:
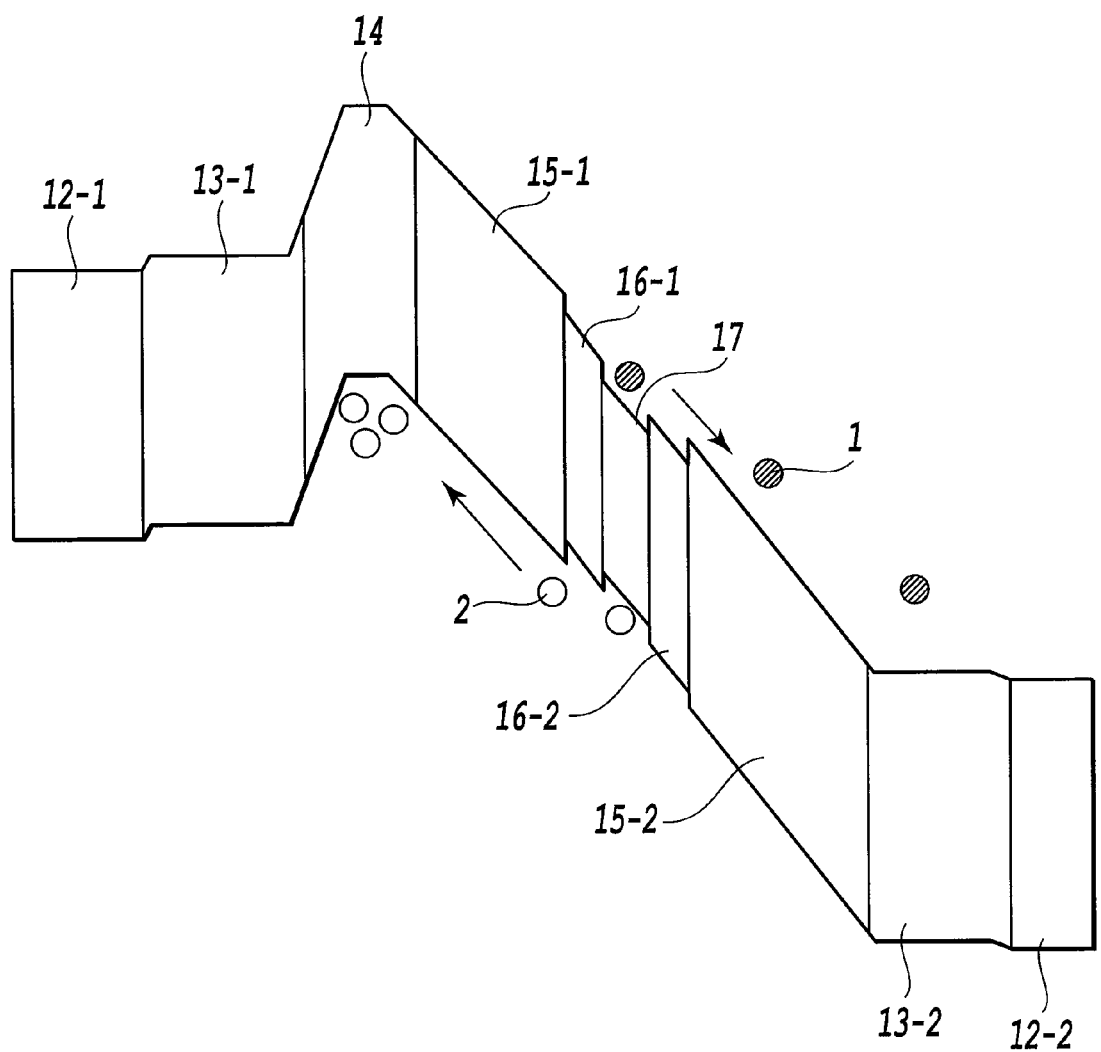
FIG. 2 is a band diagram in a section along the line segment II-II' of FIG. 1.
Figure 3:
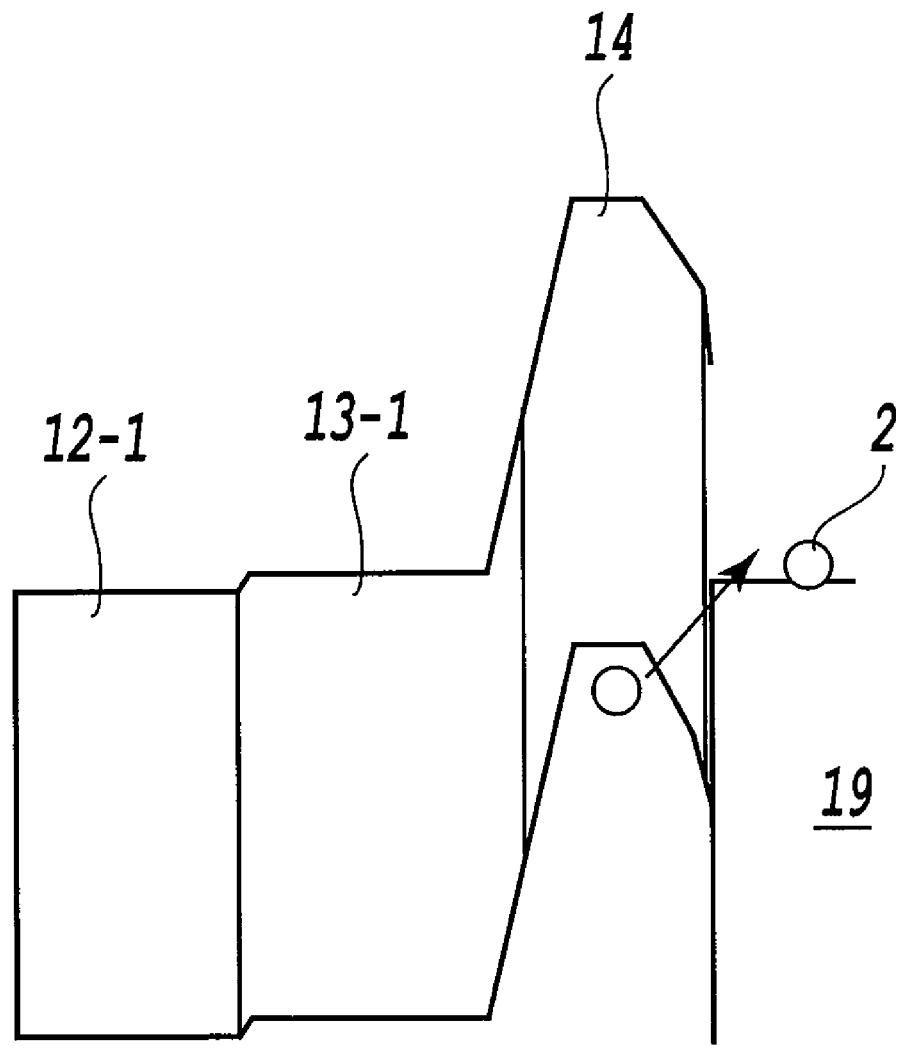
FIG. 3 is a band diagram in a section along the line segment III-III' of FIG. 1.

In this semiconductor optical modulator 10, when a positive voltage with respect to first n-type electrode 18-1 is applied to second n-type electrode 18-2, an electric field is induced in core layer 17 resulting in a normal operating condition. The band diagram in this condition is shown in FIGS. 2 and 3. FIG. 2 is a band diagram in a section along the line segment II-II' of FIG. 1 and FIG. 3 is a band diagram in a section along the line segment of FIG. 1. Regardless of whether p-type cladding layer 14 is neutralized or depleted, a barrier against electrons is formed, thereby suppressing the electron injection from n-type cladding layer 13-1.

In optical modulator 10, the optical waveguide is formed with the layers from 13-1 to 13-2, and the light propagating in this waveguide is modulated by a change in refractive index that occurs due to voltage application. In the condition of light absorption in core layer 17, of the generated carriers, while electrons 1 flow to the anode side (layers 12-2, 13-2), holes 2 are trapped in p-type cladding layer 14.

In a conventional structure where there is no p-type electrode 19 in contact with the first n-type electrode, certain amount of holes determined by the balance between light absorption and recombination rate are to be accumulated in p-type cladding layer 14. As described earlier, this reduces the height of the electron barrier of p-type cladding layer 14 and causes a decrease in the applicable reverse voltage of the semiconductor optical modulator (the phototransistor behavior). On the other hand, in semiconductor optical modulator 10 according to the present invention, because p-type cladding layer 14 is connected to first n-type electrode 18-1 via p-type electrode 19, even when a neutral layer does not remain in p-type cladding layer 14 immediately under p-type electrode 19, excessive holes flow laterally in p-type cladding layer 14 (FIG. 1) and are eventually absorbed in p-type electrode 19 beyond a Schottky barrier formed at the interface of the P-type cladding layer/p-type electrode interface (FIG. 3). Then, by connecting p-type electrode 19 in contact with p-type cladding layer 14 to n-type electrode 18-1, the problem of accumulation of holes that occurs in an optical modulator of this kind can comparatively easily be resolved.

Embodiment 2

Figure 4:
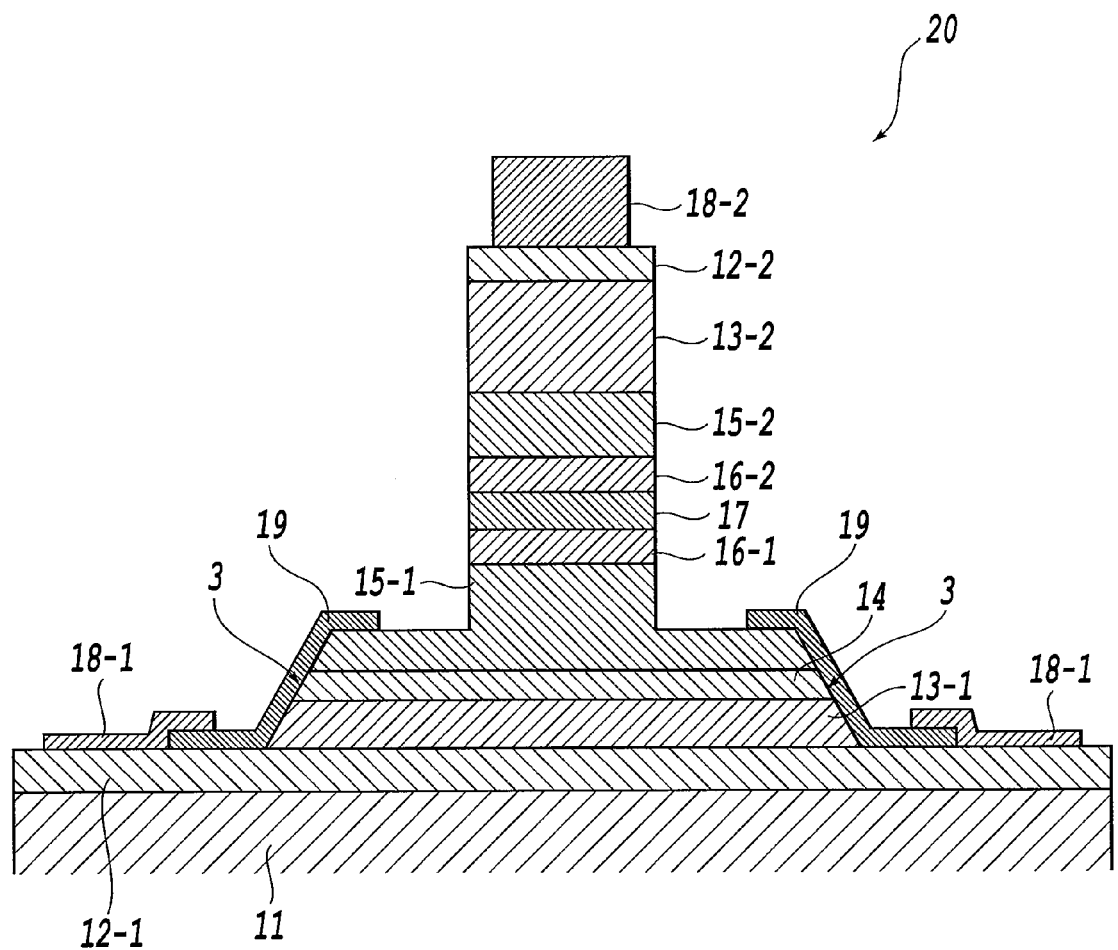
FIG. 4 is a sectional view of a semiconductor optical modulator in accordance with the second embodiment of the present invention.

FIG. 4 shows a sectional view of a semiconductor optical modulator in accordance with the second embodiment of the present invention. This semiconductor optical modulator 20 in accordance with the second embodiment of the present invention works essentially in the same way as the semiconductor optical modulator 10 in accordance with the first embodiment. In this semiconductor optical modulator 20, however, p-type electrode 19 is formed on the side surface of the mesa composed of first n-type cladding layer 13-1, p-type cladding layer 14, and first low-concentration cladding layer 15-1.

In the structure shown in FIG. 1, because p-type cladding layer 14 is relatively thin, it is not always easy in terms of fabrication to ensure a contact of the p-type electrode from the top surface. In contrast, in the structure of FIG. 4, the connection with the p-type electrode can readily made by ensuring a side contact with p-type cladding layer 14 from the side surface of the mesa through interface 3.

In p-type cladding layer 14, when the doping concentration is set low, this layer becomes more depleted due to the surface charge. Therefore, the electric potential in a depleted portion increases, the conductivity of this p-type cladding layer decreases, and the lateral flow of holes 2 may become insufficient. In a structure in which the top of p-type cladding layer 14 is covered with first low-concentration cladding layer 15-1, as shown in FIG. 4, as the influence of the surface charge decreases and the above-described blocking factor decreases, the p-type cladding layer can readily exhibit its inherent effect.

Embodiment 3

Figure 5:
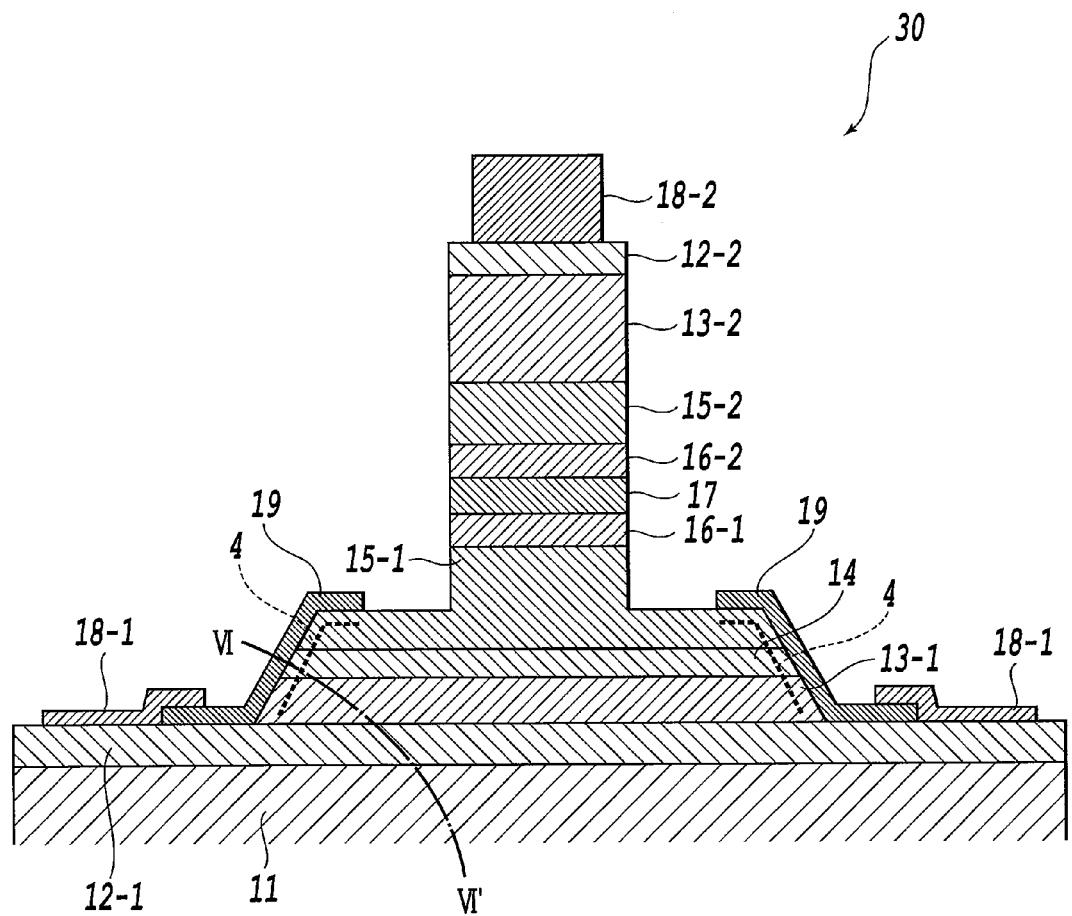
FIG. 5 is a sectional view of a semiconductor optical modulator in accordance with the third embodiment of the present invention.

FIG. 5 shows a sectional view of a semiconductor optical modulator in accordance with the third embodiment of the present invention. In this third embodiment, in addition to the structure in accordance with the second embodiment, p-type ohmic region 4 is formed on the side surface of the mesa composed of first low-concentration cladding layer 15-1, p-type cladding layer 14, and first n-type cladding layer 13-1. This p-type ohmic region 4 can be formed by thermally diffusing Zn after the formation of the mesa or by diffusing Zn when forming p-type electrode 19 composed of an alloy layer with Au and Zn.

Figure 6:
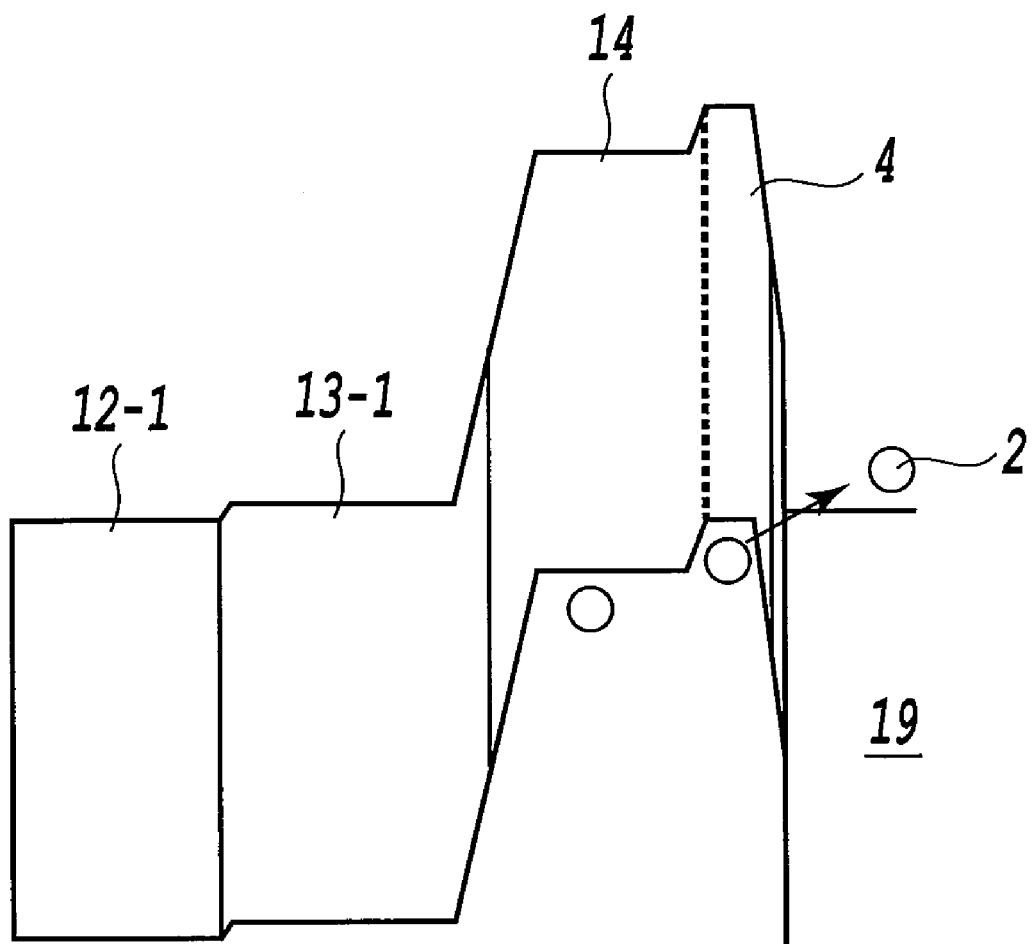
FIG. 6 is a band diagram in a section along the line segment VI-VI' of FIG. 5.

FIG. 6 shows a band diagram in a section along the line segment VI-VI' of FIG. 5. Because p-type ohmic region 4 has a higher doping concentration than p-type cladding layer 14, as shown in FIG. 6, a tunnel barrier against holes becomes thin, and it, therefore, does not prevent the flow of holes and can more effectively eliminate holes 2 by p-type electrode 19.

Embodiment 4

Figure 7:
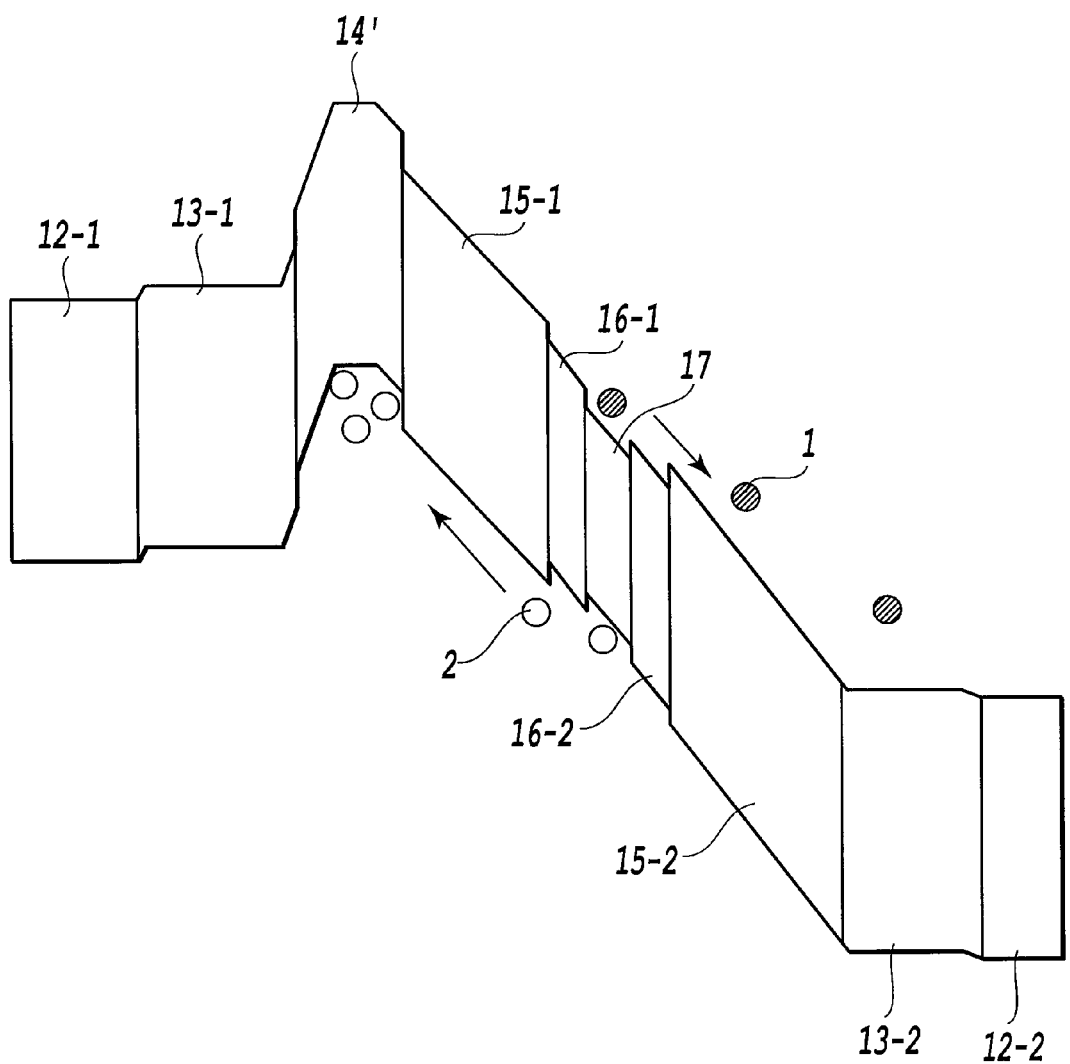
FIG. 7 is a band diagram of a semiconductor optical modulator in an embodiment in accordance with the fourth embodiment of the present invention.
Figure 8:
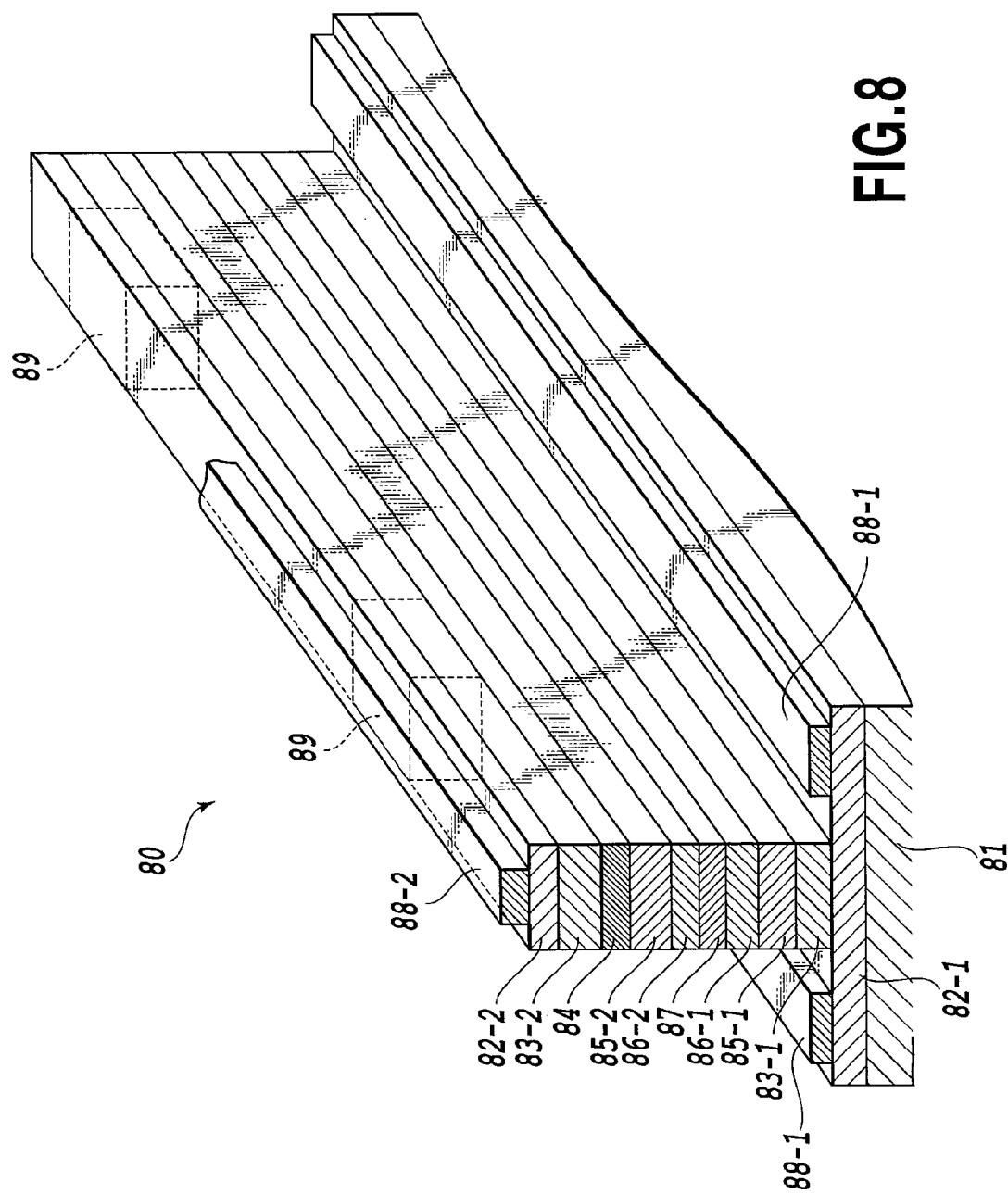
FIG. 8 is a diagram showing an example of the structure of a semiconductor optical modulator according to a conventional technology.

A semiconductor optical modulator in accordance with the fourth embodiment of the present invention has a hetero junction structure in which p-type cladding layer 14 in the structures of the above-described first to third embodiments is replaced with a semiconductor material having a smaller electron affinity than first n-type cladding layer 13-1, typically, with InAlAs. This is a kind of what is called type II hetero junction. The band diagram in this structure is shown in FIG. 7. Because the electric potential of this replaced portion 14' becomes relatively low, a structure having a higher barrier against electrons will result. With this structure, the barrier against the accumulated hole charges becomes higher and it can keep back a decrease in withstand voltage associated with the phototransistor behavior.

From the above, the semiconductor optical modulators in accordance with the present invention can solve the problem "the decrease in applicable reverse voltage" which is caused by a phenomenon "the accumulation of holes associated with light absorption" in npin-type optical modulators having the feature of low driving voltage. Furthermore, it is not required to change the conductive type in portions of the regions by Zn diffusion and Be ion implantation as seen in Patent Document 2, which makes manufacturing process relatively simple and does not incur an increase in the manufacturing cost. Accordingly, optical modulators with higher reverse voltage and more stability can be manufactured at low cost.

While the present invention has been described specifically based on several embodiments, in view of many feasible forms to which the principle of the invention can be applied, the embodiments described herein are illustrative only and are not intended to limit the scope of the invention. For example, in the above embodiments, the single waveguide structure serving as an optical modulator is described. By way of multiple combinations of such waveguides or combination with connecting waveguides and optical split waveguides that permit the propagation of optical signals, a Mach-Zehnder type optical modulator, an optical cross-connect switch and the like may be configured. In the above embodiments, as described by way of an example, although InP and InGaAsP are used as semiconductor materials, other structures are also feasible such as a structure with InGaAsP replaced with InGaAlAs and a structure with InGaAsP and InGaAlAs combined, the above embodiments are not to limit semiconductor materials. As stated, the structure and details of the embodiments described herein can be modified without departing from the spirit of the present invention.

The invention claimed is:

1. An npin-type semiconductor optical modulator in which layers are sequentially stacked, with a cathode layer arranged on the substrate side, including at least a first n-type cladding layer, a p-type cladding layer, a core layer and a second n-type cladding layer, characterized in that the p-type cladding layer is electrically connected to an electrode of the cathode layer.

2. The semiconductor optical modulator according to claim 1, characterized in that the p-type cladding layer forms a mesa and a side surface of the mesa is electrically connected to the electrode of the cathode layer.

3. The semiconductor optical modulator according to claim 1, characterized in that a p-type ohmic region is formed in a portion of the p-type cladding layer and the p-type ohmic region is electrically connected to the electrode of the cathode layer.

4. The semiconductor optical modulator according to claim 1, further including a first intermediate layer below the core layer and a second intermediate layer above the core layer, characterized in that the band gap energy of the first intermediate layer is larger than that of the core layer and is smaller than that of a layer below the first intermediate layer, and in that the band gap energy of the second intermediate layer is larger than that of the core layer and is smaller than that of a layer above the second intermediate layer.

5. The semiconductor optical modulator according to claim 1, characterized in that the p-type cladding layer has a smaller electronic affinity than that of the first n-type cladding layer.

6. The semiconductor optical modulator according to claim 2, characterized in that a p-type ohmic region is formed in a portion of the p-type cladding layer and the p-type ohmic region is electrically connected to the electrode of the cathode layer.

7. The semiconductor optical modulator according to claim 2, further including a first intermediate layer below the core layer and a second intermediate layer above the core layer, characterized in that the band gap energy of the first intermediate layer is larger than that of the core layer and is smaller than that of a layer below the first intermediate layer, and in that the band gap energy of the second intermediate layer is larger than that of the core layer and is smaller than that of a layer above the second intermediate layer.

8. The semiconductor optical modulator according to claim 3, further including a first intermediate layer below the core layer and a second intermediate layer above the core layer, characterized in that the band gap energy of the first intermediate layer is larger than that of the core layer and is smaller than that of a layer below the first intermediate layer, and in that the band gap energy of the second intermediate layer is larger than that of the core layer and is smaller than that of a layer above the second intermediate layer.

9. The semiconductor optical modulator according to claim 2, characterized in that the p-type cladding layer has a smaller electronic affinity than that of the first n-type cladding layer.

10. The semiconductor optical modulator according to claim 3, characterized in that the p-type cladding layer has a smaller electronic affinity than that of the first n-type cladding layer.

11. The semiconductor optical modulator according to claim 4, characterized in that the p-type cladding layer has a smaller electronic affinity than that of the first n-type cladding layer.

* * * * *